US 6,605,215 B2

(12) United States Patent
Assion

(10) Patent No.: US 6,605,215 B2
(45) Date of Patent: Aug. 12, 2003

(54) HYBRID SPIN-ON FILTER

(76) Inventor: Norbert Assion, 23 Cynthia La., Shelton, CT (US) 06484

( * ) Notice: Subject to any disclaimer, the term of this patent is extended or adjusted under 35 U.S.C. 154(b) by 0 days.

(21) Appl. No.: 09/812,977

(22) Filed: Mar. 20, 2001

(65) Prior Publication Data

US 2002/0134737 A1 Sep. 26, 2002

(51) Int. Cl.$^7$ ............................................... B01D 27/14
(52) U.S. Cl. ..................... 210/253; 210/117; 210/136; 210/256; 210/259; 210/261; 210/262; 210/315; 210/418; 210/440; 210/DIG. 13; 210/DIG. 17
(58) Field of Search ................................. 210/315, 340, 210/342, 418, 429, DIG. 13, DIG. 17, 253, 254, 256, 259, 439, 440, 117, 136, 261, 262

(56) References Cited

U.S. PATENT DOCUMENTS

| | | | |
|---|---|---|---|
| 2,843,268 A | * | 7/1958 | Kennedy ..................... 210/130 |
| 3,021,955 A | * | 2/1962 | Joyce .......................... 210/132 |
| 3,269,541 A | * | 8/1966 | Neely .......................... 210/132 |
| 3,467,256 A | * | 9/1969 | Humbert, Jr. et al. ... 210/323.2 |
| 3,986,960 A | | 10/1976 | Wire et al. ................... 210/232 |
| 4,048,071 A | | 9/1977 | Yamada et al. ................ 210/90 |
| 4,738,776 A | | 4/1988 | Brown ........................ 210/168 |
| 5,178,753 A | | 1/1993 | Trabold ...................... 210/130 |
| 5,552,065 A | | 9/1996 | Meddock et al. ........... 210/808 |
| 6,350,379 B1 | * | 2/2002 | Roll et al. ................ 210/323.2 |

FOREIGN PATENT DOCUMENTS

JP  45-7112  * 3/1970 ................. 210/315

* cited by examiner

*Primary Examiner*—Matthew O. Savage
(74) *Attorney, Agent, or Firm*—Harrington & Smith, LLP

(57) ABSTRACT

An oil filter including a housing, a first oil filter element, a second oil filter element disposed circumferentially about a length of the first oil filter capable of filtering particles of a smaller size than the first oil filter element. A first oil filter inlet is disposed at a bottom portion of the housing for providing oil to be filtered to an outside surface of the first oil filter element, and a second oil filter inlet is disposed at the bottom portion of the housing and surrounding the first oil inlet for providing oil to be filtered to a bottom surface of the second oil filter element. A fluid communication path extends from a top surface of the second oil filter element into the first oil filter element such that oil filtered through the second oil filter element is mixed with oil filtered by the first oil filter element.

9 Claims, 9 Drawing Sheets

HYBRID SPIN-ON FILTER

FIELD OF THE INVENTION

This invention relates generally to filtration systems and methods and, more particularly, to a filter assembly intended to remove impurities from a liquid, such as a lubricant, and, more specifically still, to a hybrid spin-on oil filter assembly for use with an internal combustion engine, where the hybrid spin-on oil filter assembly is form and fit compatible with a conventional oil filter assembly, but which provides a dual-stage filtering action that includes a conventional oil filter in combination or in parallel with a bypass oil filter capable of filtering and retaining particles of size one micron or greater.

BACKGROUND OF THE INVENTION

Conventional internal combustion engines used in automobiles and similar vehicles include a spin-on oil filter assembly for cleaning the motor oil. However, due to the fact that the conventional oil filter assembly only effectively removes particles of size 10 microns and larger, after some period of time smaller particles build up in the engine oil and require that the engine oil be replaced. Typical engine oil, and oil filter, replacement schedules are every 3,000 miles or three months, whichever occurs first.

It is known in certain types of vehicles, such as large trucks, to use an auxiliary bypass filter for additional filtering. A typical bypass filter retrofits to the truck engine where it diverts oil through a finer auxiliary filter element at a slower flow rate than the normal oil filter (e.g. 2.5 gallons per minute or less versus about 20 to 40 gallons per minute). Passing the engine oil through the auxiliary filter element aids in filtering out particles smaller than about 40 microns in size, thereby improving engine oil life as well as the life of the engine. Reference in this regard can be had to, for example, U.S. Pat. No. 5,552,065, Meddock et al.

However, this type of filtering arrangement is not typically suitable for use with automobiles and similar types of vehicles. A first issue relates to the difficulty in retrofitting a bypass oil filter assembly to the engine. In many cases there may simply not be room to mount the bypass oil filter assembly. A second issue relates to cost, as the use of the bypass oil filter assembly is inherently more costly than the use of only the conventional type of oil filter assembly.

As can be appreciated, there is a significant body of prior art that has been built up over the decades relating to oil filters and related techniques for internal combustion engines. Representative of this prior art are the following U.S. patents.

In U.S. Pat. No. 3,986,960, Wire et al., describe a fluid filter containing a tubular canister having a contaminated fluid inlet and a filtered fluid outlet. The filter includes a solid tube forming a vertical central conduit within the canister and a plurality of axially space-apart containers mounted serially along the tube. Filtering material is located in the canisters. Ports in the tube communicate with chambers formed between the filter element and the bottom of the container. A seal is effected between the outlet of the canister and the tube, while fluid communication is provided between the inlet and the open tops of the containers such that fluid flow occurring between the inlet and the outlet takes place through the filter elements.

In U.S. Pat. No. 4,048,071, Yamada et al. describe a liquid filtering device where the peripheral surface of a coil of a filter web wound about a hollow shaft is covered by a liquid-impervious flexible coating, and the outer periphery of a first end of the coil is secured to a supporting disc so that when liquid to be filtered is caused to pass through the coil in the axial direction of the coil, the convolutions of the coil near a second end expand radially outwardly to trap contaminants in the spiral gap. Purified liquid collected at the first end of the coil is discharged through the hollow shaft. The filter unit is constructed such that a number of unites can be connected in series.

In U.S. Pat. No. 4,738,776 Brown describes a lubricant filter assembly for an internal combustion engine that includes a head member removably mounted on a base member. The head member includes a sleeve-like housing open at one end and having first and second filter units fixedly mounted therein. The outer peripheries of the filter units coact with the interior surface of the housing to form a common inlet passage. One of the filter units is provided with an interior first outlet passage which communicates with a first passage formation formed in the base member. The first passage formation communicates with a first lubricating circuit of the engine. The second filter unit is provided with an interior second outlet passage which communicates with a second passage formation formed in the base member. The second passage formation communicates with a second lubricating circuit of the engine. Seal sections are carried by the head member. One seal section effects a sealing engagement between the base member and a portion of the housing defining the open end. A second seal section is disposed within the housing and prevents direct communication between the inlet passage and the first outlet passage. A third seal section is disposed within the housing and prevents communication between the first and second outlet passages. The sealing engagement effected by the third seal section is enhanced upon the flow pressure within the interior first outlet passage being increased.

In U.S. Pat. No. 5,178,753 Trabold describes an oil filter for internal combustion engines that is used in a secondary oil circuit in addition to a conventional oil filter. The oil filter includes a filter housing in which a filter element consists of a roll of absorbent paper that is wound about a rod. The oil filter is configured as a set of elements that comprises body sections and caps, and a rod with the rolled filter element. The volume of the oil filter can be matched to a particular application by connecting a plurality of body sections with an appropriate number of rods.

In U.S. Pat. No. 5,556,543 Trabold describes an oil filter for internal combustion engines. The oil filter includes a filter housing and a filter packing made of a porous deformable material, e.g., a roll of absorbent paper. To prevent the filter packing from being deformed and thereby preventing a smooth flow through the filter packing, stabilizing elements, e.g., stabilizing bars, are provided for fixing the form and position of the filter packing within the filter housing.

A long-felt and unfulfilled need exists to provide an oil filter assembly for an internal combustion engine that provides, within a conventionally-sized oil filter container, a conventional oil filter and a bypass oil filter capable of entrapping and thus removing smaller particles from the oil than the conventional oil filter.

Prior to this invention, this need was not adequately fulfilled by the prior art filter assemblies and methods that are known to the inventor.

OBJECTS AND ADVANTAGES OF THE INVENTION

It is a first object and advantage of this invention to provide an improved oil filter assembly.

It is a further object and advantage of this invention to provide an improved oil filter assembly that contains a first oil filter as well as a bypass oil filter, capable of filtering out smaller particulates from the oil flow than the first oil filter, where the oil filter assembly is form and fit compatible with a conventional oil filter assembly.

SUMMARY OF THE INVENTION

The foregoing and other problems are overcome and the foregoing objects and advantages are realized by apparatus and methods in accordance with embodiments of this invention.

An oil filter assembly for use with an internal combustion engine provides, within a conventionally-sized oil filter container, a first or primary oil filter and a bypass oil filter that is capable of entrapping and thus removing smaller particles from the oil (e.g., one micron or greater) than the primary oil filter. The resulting primary oil filter and bypass oil filter assembly, also referred to herein as a hybrid oil filter assembly, is preferably form and fit compatible with a conventional oil filter assembly. That is, the hybrid oil filter assembly can be used to replace a conventional oil filter assembly without making or requiring any modifications to the engine or the filter housing. Furthermore, the hybrid oil filter assembly in accordance with the teachings of this invention is designed to be cost-competitive with the conventional oil filter assembly, especially when one considers the extended oil, oil filter and engine lifetimes that are achieved. The hybrid oil filter assembly is also amenable to being mass produced, and does not require the use of any non-standard materials or components during its manufacture.

In accordance with the teachings of this invention an oil filter assembly includes a housing and a first (e.g., a primary or conventional) oil filter element disposed in proximity to a bottom portion of the housing. The first oil filter element contains an open inner volume, also referred to herein as a void. A second oil filter element having a generally circular cylindrical shape is disposed circumferentially about a length of the first oil filter element. The second oil filter element may be made of rolled cellulose such as paper, and filters particles of a smaller size than the first oil filter element. In further embodiments of this invention the second oil filter element can be comprised of other filtering media, such as glass wool, plastic, cotton, as well as combinations of two or more of these as well as other filtering media suitable for entrapping particles from the oil that are smaller than the particles entrapped by the primary oil filter element.

A first oil inlet is disposed at the bottom portion of the housing for providing oil to be filtered to side surfaces of the first oil filter element, wherein filtered oil flows through a thickness of the first oil filter element to the centrally located open inner volume, and from the centrally located open inner volume through an outlet of the filter housing.

A second oil inlet is also disposed at the bottom portion of the housing and surrounds the first oil inlet. The second oil inlet provides oil to be filtered to a bottom surface of the second oil filter element.

A fluid communication path is provided from a top surface of the second oil filter element into the open inner volume of the first oil filter element such that oil filtered through a length of the second oil filter element is mixed with the oil filtered by the first oil filter element.

The fluid communication path preferably includes an orifice providing passage for filtered oil into the open inner volume of the first oil filter element, where the orifice has an area that is significantly smaller than an area of the second oil inlet. For example, the ratio of the area of the second oil inlet to the area of the orifice is about 1:400 or greater (e.g., in a range of about 1:400 to about 1:2000, proportional to the size and capacity of the filter.).

In a preferred embodiment the fluid communication path further includes a third oil filter element disposed between the top surface of the second oil filter element and the orifice, wherein the third oil filter element also filters particles of a smaller size than the first oil filter element. The third oil filter element is disposed above the first oil filter element in a stacked arrangement, and the second oil filter element is disposed circumferentially about the length of the first oil filter element and the length of the third oil filter element.

In the presently preferred embodiment the pressure of the oil at the second inlet is x psi, the pressure of the oil at the outlet of the filter housing is about x psi minus about 2% to about 6%, and the pressure of the oil at the orifice is about x psi minus about 0.2% to about 0.8%.

Preferably the housing is form and fit compatible with a conventional spin-on oil filter.

The teachings of this invention thus provide a hybrid oil filter assembly that is form and fit compatible with a conventional spin-on oil filter assembly. The hybrid oil filter assembly includes a housing and contained within the housing is a first oil flow path containing a first oil filter element for filtering particles having a first minimum size, as well as a second oil flow path containing a second oil filter element that surrounds the first oil filter element along the length thereof. The second oil filter element filters particles having a second minimum particle size that is smaller than the first minimum particle size. Oil in the first oil flow path that has been filtered by the first oil filter element and oil in the second oil flow path that has been filtered (micro-filtered) by the second oil filter element are mixed together within a void contained within the first oil filter element before being discharged from the hybrid oil filter assembly.

In the hybrid oil filter the pressure of the oil at an inlet of both of the first and second oil flow paths is x psi, the pressure of the oil at an outlet of the first oil flow path is x psi minus about 2% to about 6%, and the pressure of the oil at an outlet of the second oil flow path is x psi minus about 0.2% to about 0.8%.

The teachings of this invention also provide a method for filtering engine oil during the operation of an internal combustion engine. The method includes steps of (a) pumping engine oil into an inlet of an oil filter assembly; (b) filtering a first portion of the engine oil by passing the engine oil through a first oil flow path containing a first oil filter element for retaining particles having a first minimum size; (c) micro-filtering a second portion of the engine oil by passing the engine oil through a second oil flow path containing a second oil filter element that surrounds the first oil filter element, the second oil filter element retaining particles having a second minimum particle size that is smaller than the first minimum particle size; (d) mixing together, within a mixing zone contained within the first oil filter element, the engine oil from the first oil flow path that has been filtered by the first oil filter element and the engine oil from the second oil flow path that has been micro-filtered by the second oil filter element; and (e) discharging the mixed filtered and micro-filtered engine oil from an outlet of the oil filter assembly into the engine.

During execution of the method the pressure of the engine oil at the inlet of oil filter assembly, and at an inlet of both of the first and second oil flow paths, is x psi, the pressure of the engine oil at the outlet of the oil filter assembly is x psi minus about 2% to about 6%, and the pressure of the engine oil at an outlet of the second oil flow path is x psi minus about 0.2% to about 0.8%.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, a hybrid oil filter assembly (HOFA) integrates two filter systems into one spin-on filter housing, and may be used to replace the conventional spin-on oil filter assembly for internal combustion engines found in automobiles, vans, buses, trucks, heavy machine equipment, other internal combustion motor applications and hydraulic systems.

The HOFA can be mounted exactly the same as a normal, conventional spin-on oil filter. The HOFA can be implemented using the same form factors, sizes and threads as every other currently available spin-on filter.

A significant difference between the HOFA design and the conventional spin-on motor oil filter is an ability to filter the engine oil micro-fine clean. In practice, the filtered motor oil can become as clean or cleaner than new, unused motor oil. The cleaning process provides an ability to remove particles of size about one micron or greater. The micro-cleaned motor oil protects the movable engine parts and thus prolongs the active engine life. Furthermore, the normal oil change interval can be prolonged to, as an example, 15,000 miles or greater.

Figure 1:
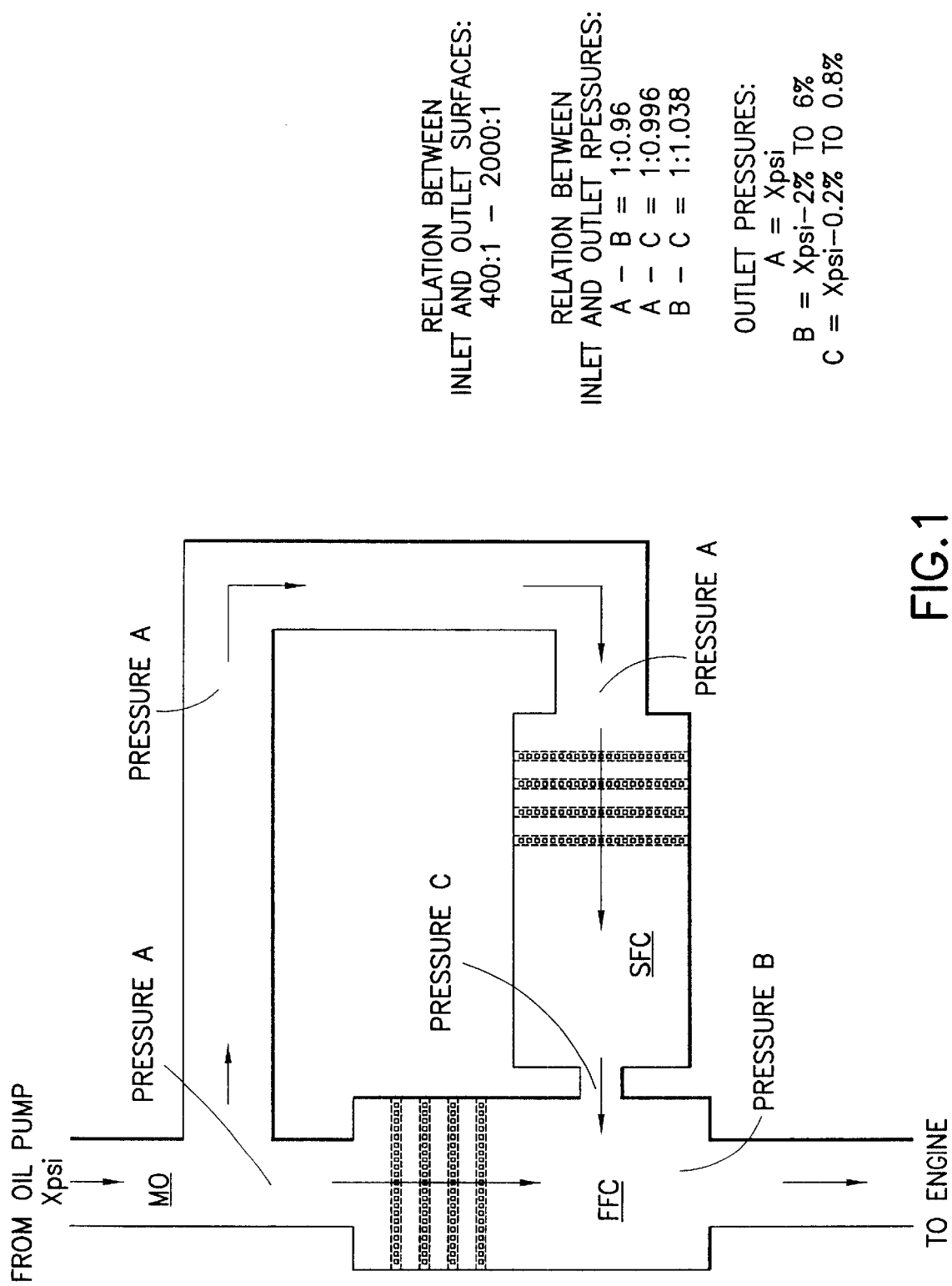
FIG. 1 is diagram depicting the oil flow paths and typical pressures of the hybrid oil filter assembly in accordance with the teachings of this invention.

Referring to FIG. 1, motor oil (MO) arrives from the motor oil pump of the engine and passes through holes in the bottom of the filter housing into the HOFA (Point A). Most of the oil enters a first oil flow path containing a first filter chamber (FFC), while a significantly smaller portion of the oil enters a oil flow path containing a second filter chamber (SFC). The first oil filter chamber is substantially filled with a first (conventional) filter media, such as pleated paper, and is filtered in a conventional manner. By example, the first filter chamber removes particles down to a size of about 10 microns. The second filter chamber is substantially filled with a second filter media, such as rolled cellulose or paper, or glass wool, or plastic, or cotton, or mixtures of these and other filter materials, and is filtered (micro-filtered) so as to remove particles that are smaller in size than the particles removed in the first filter chamber. For example, the particles removed in the second filter chamber may be as small as about one micron. The oil pressure at the outlet of the second filter chamber (designated C) is about 0.2% to about 0.8% less than the inlet pressure of x psi at point A. The oil pressure at the outlet of the first filter chamber (designated B) is about 2% to about 6% less than the inlet pressure of x psi at point A. Since the filtered oil from the second filter chamber is injected under significant pressure into the first filter chamber, the interior volume of the first filter chamber also serves as a mixing zone wherein turbulent mixing occurs between the filtered oil in the first filter chamber (FFC) and the micro-filtered oil injected from the second filter chamber (SFC). Micro-filtered oil in the context of this invention includes oil that has been subjected to a filtering or cleaning operation wherein particles of a smaller size (e.g., down to about one micrometer) are retained than are retained in the primary or conventional oil filter element (e.g., about 10 micrometers).

FIG. 1 also shows the relationships between the inlet and outlet surface areas, and the relationships between the inlet and outlet pressures.

Figure 2:
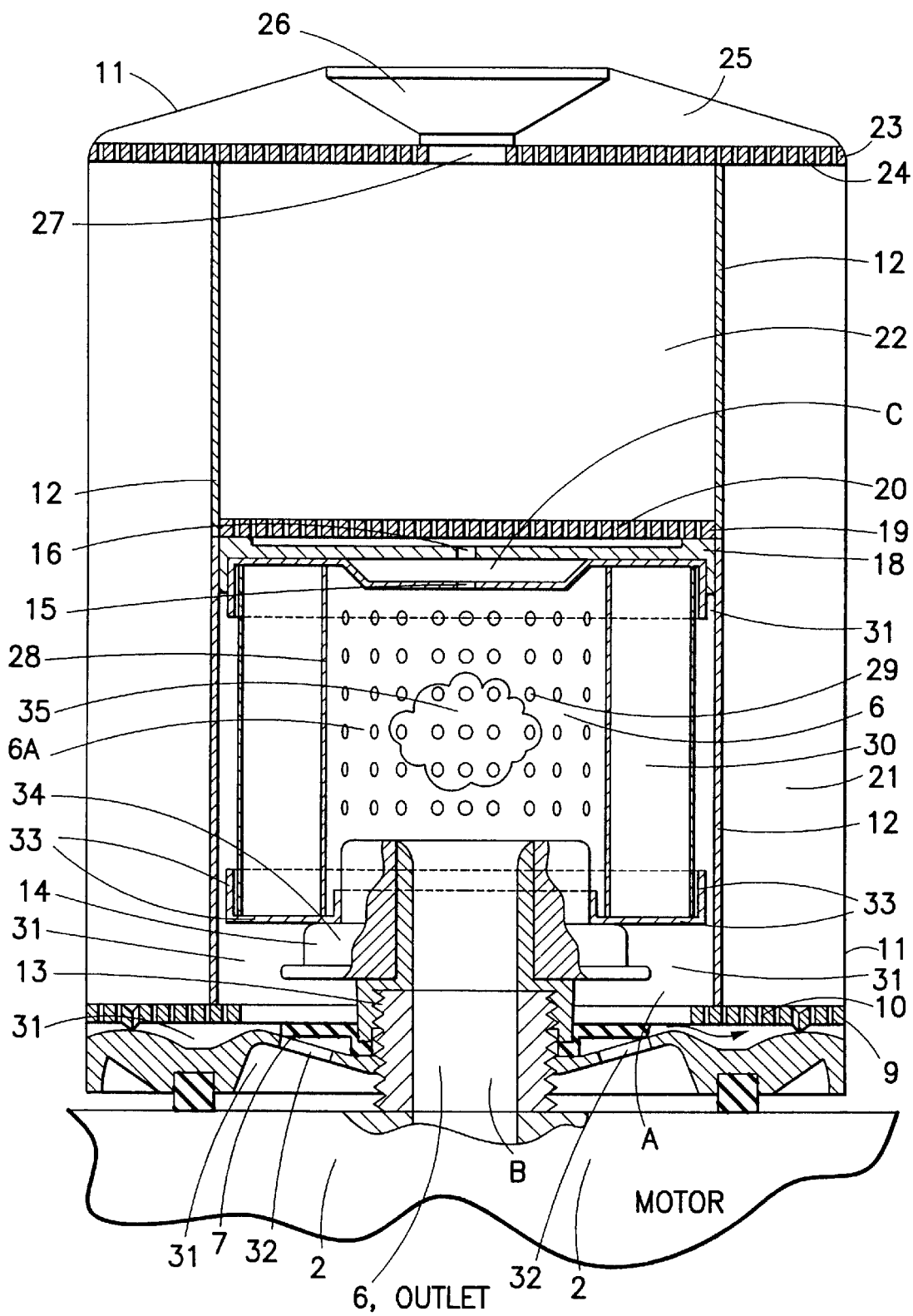
FIG. 2 is a cross-sectional view of one presently preferred embodiment of the hybrid oil filter assembly.
Figure 2A:
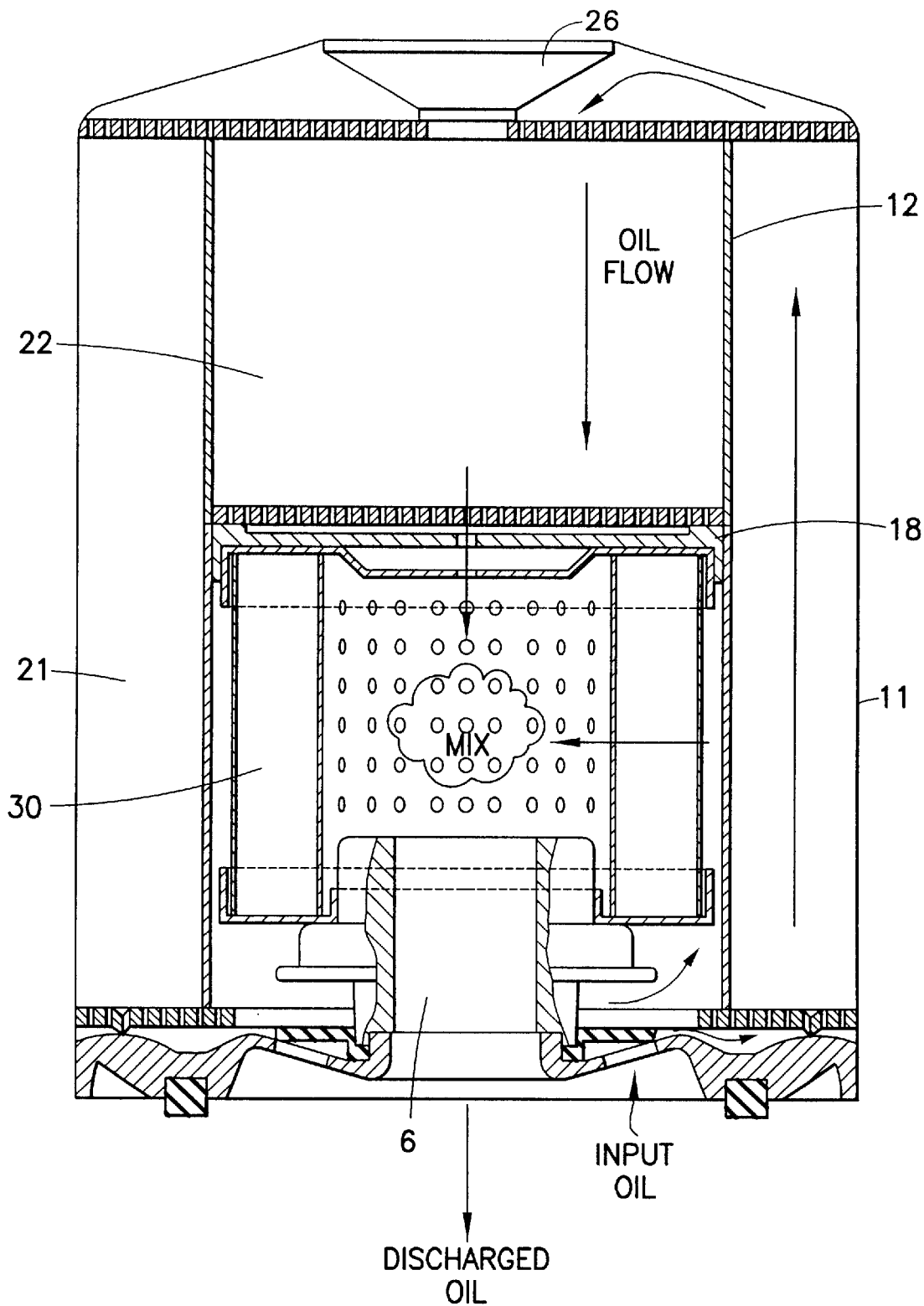
FIG. 2A is a simplified cross-sectional view of the embodiment of FIG. 2 with the internal filtering material removed so as to more clearly show the various inner volumes of the hybrid oil filter assembly.

Referring to FIGS. 2 and 2A, motor oil 2 arriving with high pressure from the engine's oil pump passes through holes 32 in the bottom of the filter housing. Oil fills all of the spaces 31 beneath and above the holes 32 before entering the filter housing 11 and encountering the two types of filter media.

One filter media is a filter element 30 which forms part of the normal or conventional filter. The filter element 30 may be a conventional pleated paper type of filter material. Filter element 30 rests in a collar 33 supported by an assembly 14 that includes a threaded insert 13 for engaging in a conventional manner threads that protrude from the motor housing. An oil holding valve 7 may be provided to limit oil spillage during filter spin-off.

A second filter media includes a first filter package embodied, in a preferred but not limiting embodiment, as a first micro-filter paper element or insert 21 that is positioned circumferentially about the first filter element 30, and is separated therefrom by a tube 12. The second filter media further may also include a second filter package embodied, in a preferred but not limiting embodiment, as a second micro-filter paper element or insert 22 positioned over the top of the normal filter element 30. In this case the tube 12 is longer that the filter element 30 and separates the two micro-filter elements or inserts 21, 22. Fluid communication between inserts 21 and 22 is made through an open space 25 at the top of the filter housing 11, and through a top outlet/inlet plate 23 having a plurality of holes 24. A spacer element 26 is placed between the top surface of the end of the filter housing 11 and the top plate 23 for urging the plate 23 against the top surfaces of the filter inserts 21 and 22. A bottom filter plate 19 having holes 20 is located beneath the second micro-filter element 22, above a back pressure valve 18, preferably made of silicone, which is disposed over the housing from filter 30 to provide a seal between all other filter mediums and oil chambers. The back pressure valve/seal has a centrally located orifice 16. Micro-filtered oil flows through the orifice 16 into the volume of the filter center 6A where it mixes with the oil filtered through the first filter media element 30.

In operation, the greatest volume of incoming oil passes through holes 32 to the side surfaces of the first filter media element 30, and the cleaned oil enters the space or void 6A at the center of the normal filter element 30. From here the cleaned oil flows to the bearings and other parts of the engine.

A smaller volume of oil passes through holes 10 of a main inlet plate 9 (see also FIGS. 4, 6, 7, 8), with the same pressure as the oil that passes into the filter element 30, and in through the filter elements 21 and 22. The oil passes to the bottom surface of the micro-filter element 21, through holes 24 of the upper outlet/inlet plate 23, through the length of the second filter element 21, and arrives at the space 25 at the top of the filter housing 11. The micro-fine filtered oil exits the space 25, passes through additional holes 24 of the upper plate 23, passes through the second micro-filter paper element or insert 22, passes through holes 19 in plate 20 to the back pressure valve 18 and flows out through the orifice 15 of the top collar 31 of the filter into the volume of the filter center region 6A. Once the micro-filtered oil arrives in the center region 6A of the normal filter portion the micro-fine filtered oil is mixed with the normally filtered oil. The mixed clean oil then flows to the engine through the conduit or outlet 6.

The HOFA design employs a ratio of distribution of the oil and its pressure. More particularly, the HOFA operates based on the respective ratios of the different pressures in different parts of the filter, resulting from different oil flow volumes.

The incoming oil 2 from the oil pump flows under pressure into the filter housing 11 and passes through the two different filter media 21/22 and 30. The pressure on all surfaces is equal, i.e., on the surface of the normal filter element 30, on the surface of the micro-filter elements 21/22, and on the surface of the main inlet plate 9. The oil passes relatively quickly through the pleats of the normal filter element 30, but requires significantly more time to pass through the finer texture of the micro-filter elements 21/22. In a presently preferred embodiment the micro-filter elements 21 and 22 are tightly rolled paper. The paper may be similar to that of bathroom tissue, but may be manufactured for use in the HOFA. As a consequence about 95% of the incoming oil 2 passes through the normal filter element 30 and the cleaned oil flows out of conduit 6, at lower pressure, in the direction of the engine. Meanwhile, the same incoming pressure forces about 5% the incoming oil 2 through the micro-filter element 21, through the space 25 above the micro-filter element 21, through the upper outlet/inlet plate 23, through micro-filter element 22, through the back pressure valve 18 and then through the outlet orifice 15. This micro-filtered oil mixes at 35 with the normally filtered oil that passes through normal filter element 30, and thus joins the filtered oil passing through conduit 6 into the engine. Over time, all of the engine oil will pass through the micro-filter elements 21 and 22, and particles smaller than those trapped in the normal filter element 30 are retained and filtered out of the oil stream, which is the desired result.

Based on the determined ratios between oil pressure, inflow volume, outflow volume, inlet surface and outlet surface in the micro-filter portion of the HOFA, the micro-filtered oil flows through the outlet orifice 15 with a higher pressure than the pressure of the oil within the normal filter portion. Since the incoming oil volume cannot flow out at the same time through the orifice 15 at the top of the normal filter portion, consequently it forms a high oil pressure inside and around the micro-filter element inserts 21 and 22, which has typically the same oil pressure as the pressure in the line coming from the oil pump. The result is that the micro-filter element inserts 21 and 22 are constantly immersed in the oil, and the microscopic pores stay open and do not become compressed. The oil flow is thus normal in all directions within the cellulose package (micro-filter element inserts 21 and 22), and particles of size about one micron and greater are captured and retained in the filter element inserts 21 and 22. In the presently preferred, but not limiting, embodiment the ratio between the inlet area and the outlet area is about 400:1 at a pressure ratio of about 1:0.996.

Contrary to the micro-filter portion, the difference between the inlet and outlet pressure of the normal full flow filter 30 is greater than the difference between the inlet pressure and the outlet pressure of the micro-fine filter elements 21 and 22. This is true because the resistance in the engine is less than at the outflow orifice in the micro-filter portion. A reason for this behavior relates to the resistance of the engine oil exiting the micro-filter portion at orifice 15. The ratio between inlet and outlet pressure of the full flow filter 30 is about 1:0.96.

The above explanation of the different behaviors of the two filtering zones within the filter is an important consideration in explaining the operation of the filter. The pressure differential causes the high pressure micro-fine cleaned oil to exit from the space 25 at the top of the filter housing 11, to be forced through the micro-filter media 22 and through the orifice 15 in order to be mixed with the cleaned oil within the mixing volume 6A of the normal filter 30.

FIGS. 3–12, illustrating various components that were described above, provide further details of the placement of the components, their shapes, and the construction of the HOFA.

In the illustrated embodiment the filter housing 11 has a total length of about 130 mm and a diameter of about 93 mm. The thickness of the micro-filter insert 21 is about 13.5 mm, the diameter of the micro-filter element 22 is about 62 mm, the diameter of the normal filter element 30 is about 55 mm, and the diameter of the central volume 6A is about 35 mm. The diameter of the orifice 15 is about 3.0 mm, and the ratio of total inlet area (the holes 10 in the inlet plate 9) to the orifice 15 is about 1:400. The length of the first micro-filter element 21 is about 110 mm, the length of the second micro-filter element 22 is about 45 mm, and length of the conventional oil filter element 30 is also about 45 mm.

In one embodiment the fluid communication path comprises an orifice providing passage for filtered oil into the open inner volume of the first oil filter element; the orifice having a flow path area that is smaller than a flow path area of said second oil inlet. In one embodiment a ratio of the area of the second oil inlet to the area of said orifice is about 400:1 or greater.

The foregoing and other dimensions, materials, pressures and the like are exemplary, and are not to be construed as being a limitation upon the practice of this invention.

Figure 2B:
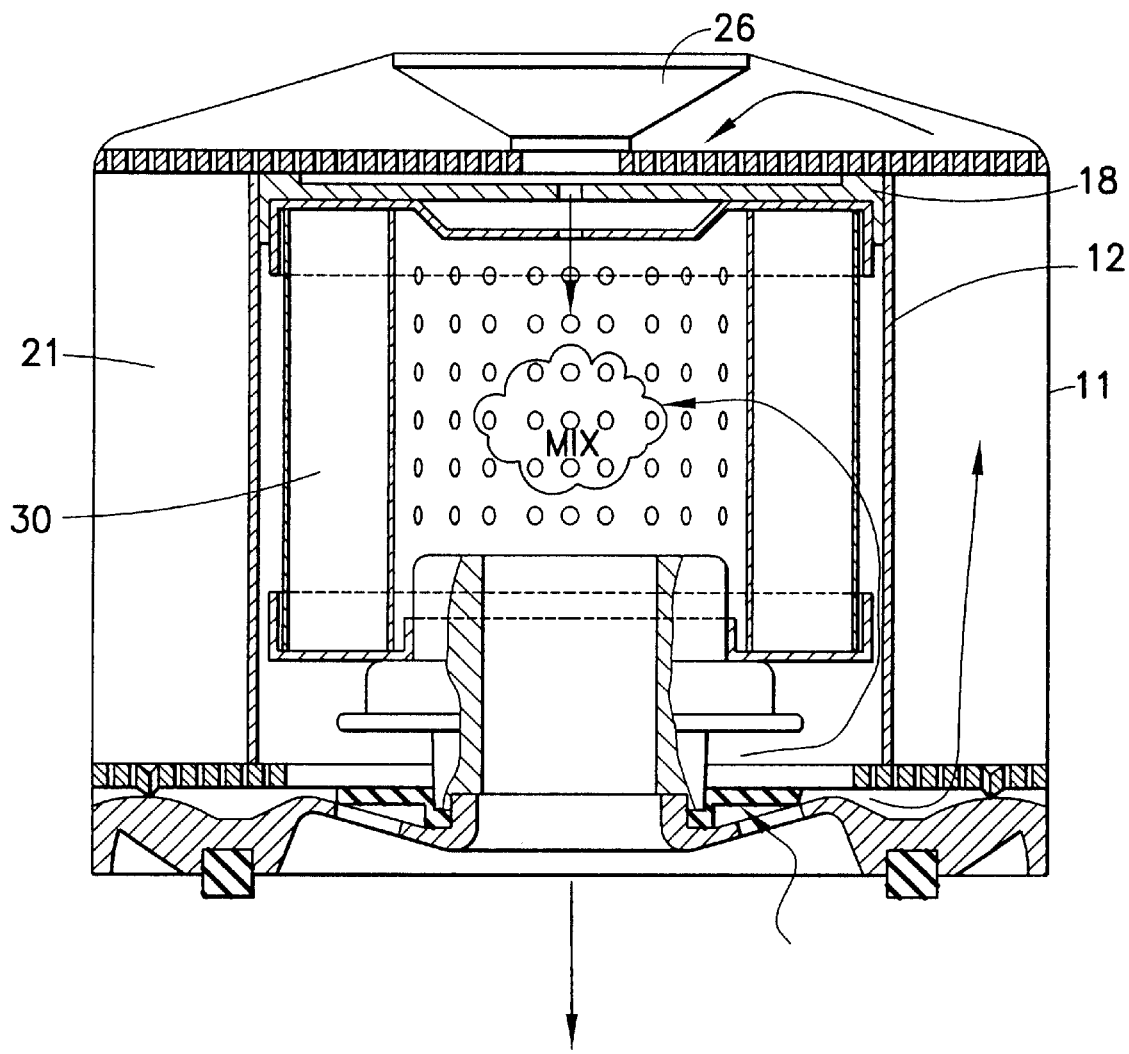
FIG. 2B is a cross-sectional view of another presently preferred embodiment of the hybrid oil filter assembly.
Figure 3:
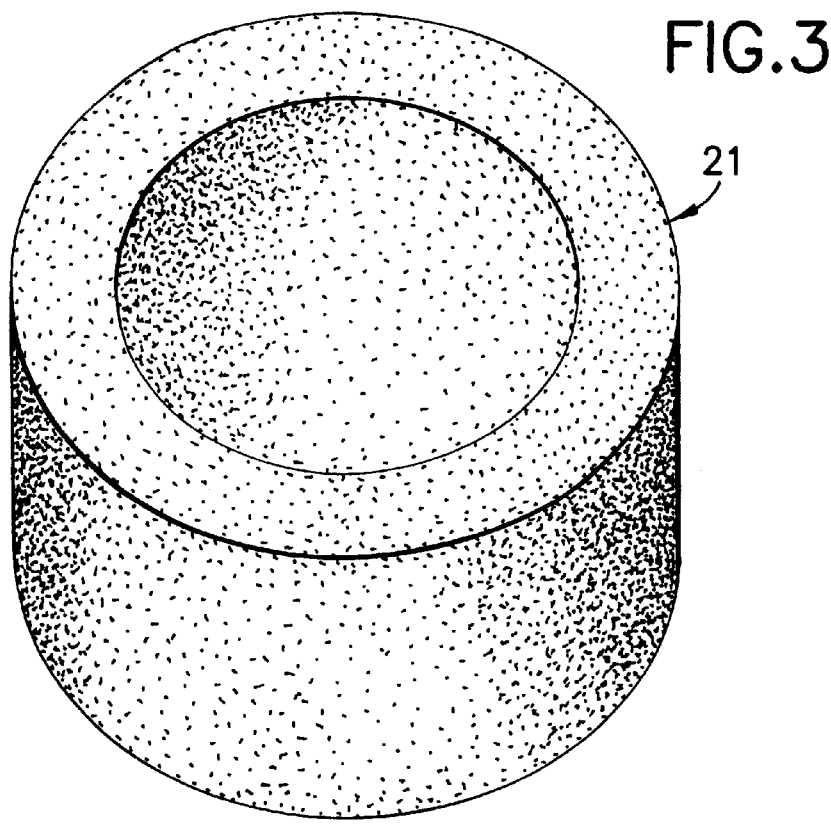
FIG. 3 is an elevational view of a first micro-filter element insert.
Figure 4:
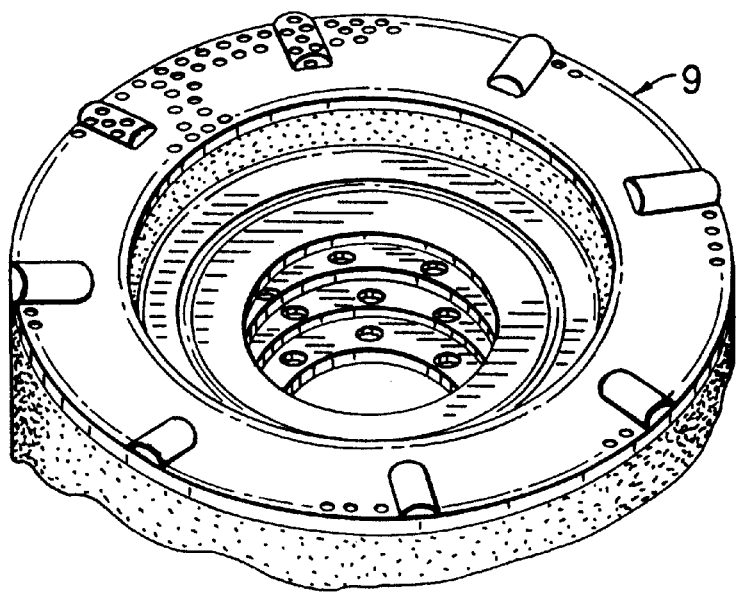
FIG. 4 is a bottom view (looking from the motor) of the normal filter element and the main inlet plate.
Figure 5:
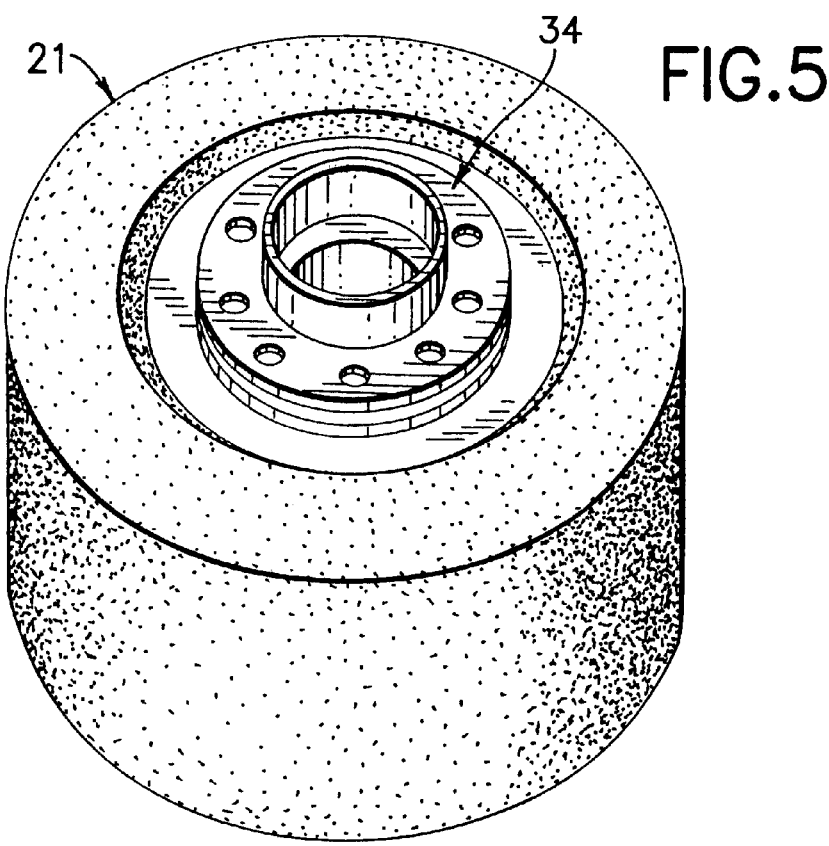
FIG. 5 is a bottom view showing a bypass valve in position.
Figure 6:
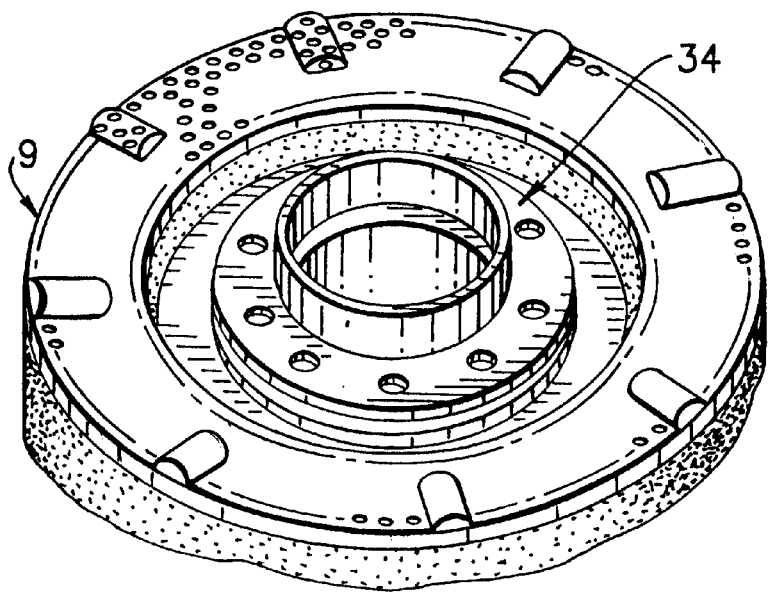
FIG. 6 is a bottom view showing in greater detail the oil inlet to the normal filter and the oil inlet to the micro-filter, including the bypass valve.
Figure 7:
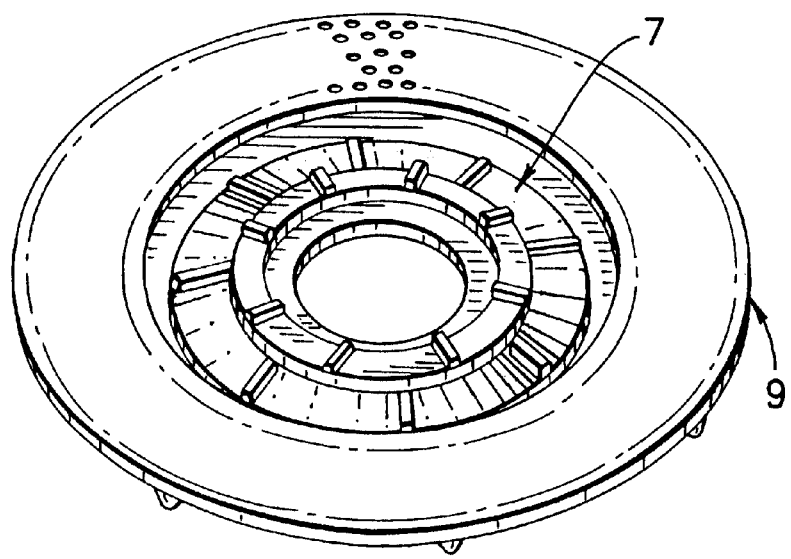
FIG. 7 is a top view of an oil holding valve and the surrounding inlet plate to the micro-filter insert.
Figure 8:
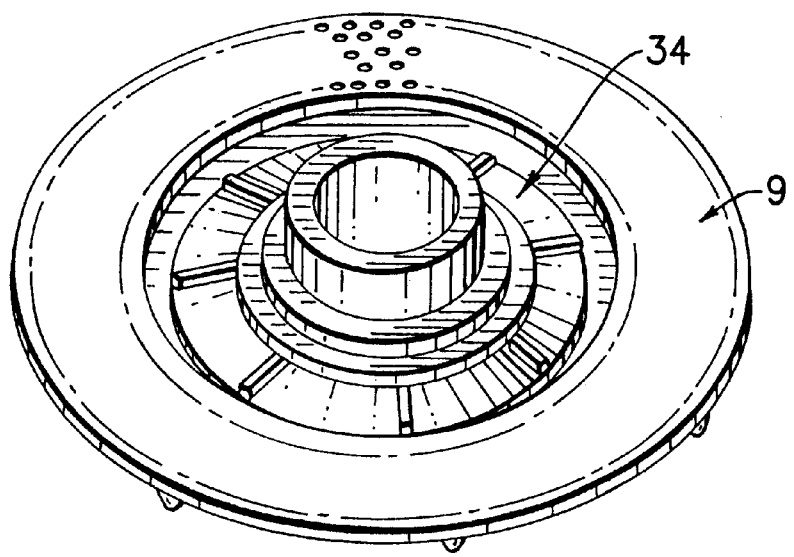
FIG. 8 is a top view of the oil holding valve and the surrounding inlet plate to the micro-filter insert, as well as the bypass valve positioned over the oil holding valve.
Figure 9:
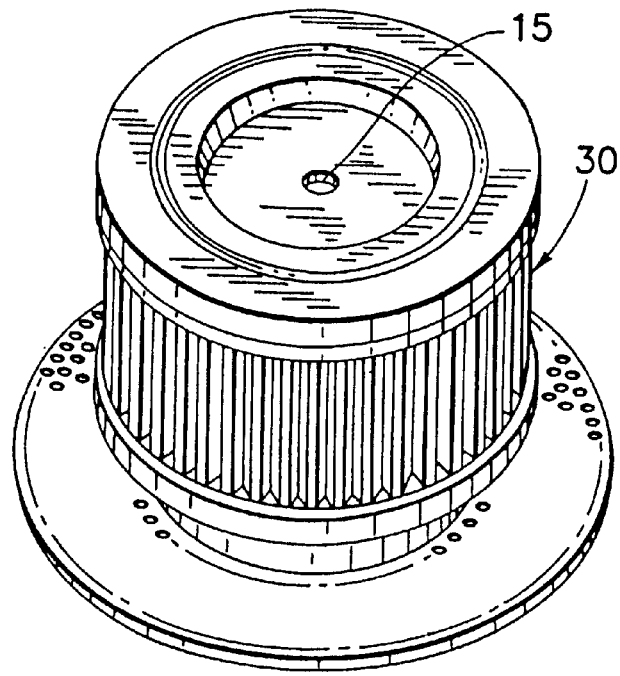
FIG. 9 is a top view depicting the normal oil filter element that contains an orifice providing fluid communication between the high pressure micro-filtering portion and the lower pressure normal filtering portion.
Figure 10:
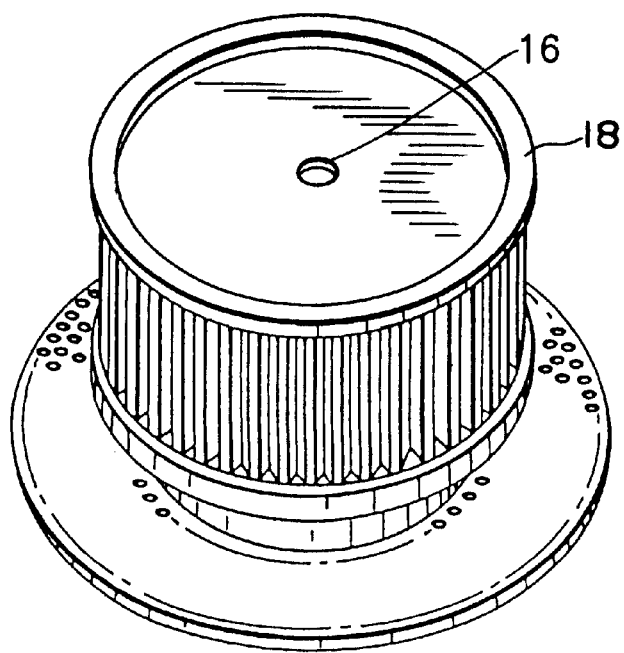
FIG. 10 shows a back pressure valve and seal between the normal filter, the inside of a micro-filter tube and an upper outlet/inlet plate.
Figure 11:
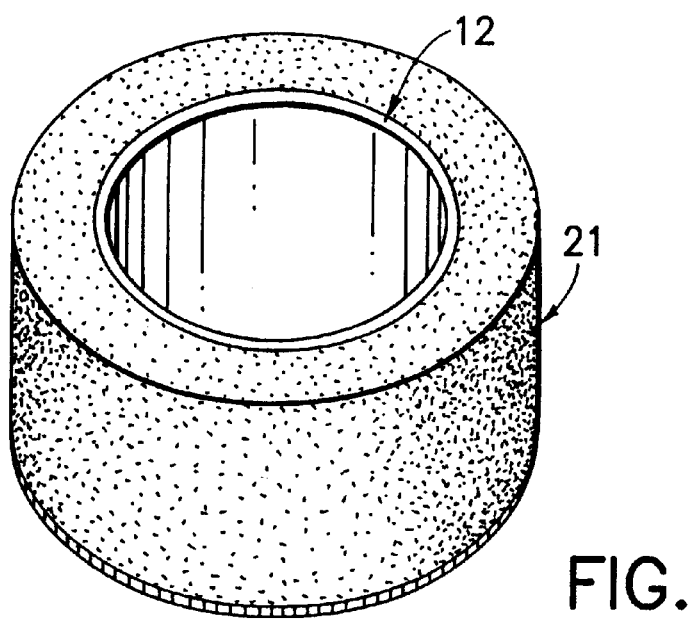
FIG. 11 is a top view of the outer micro-filter element.
Figure 12:
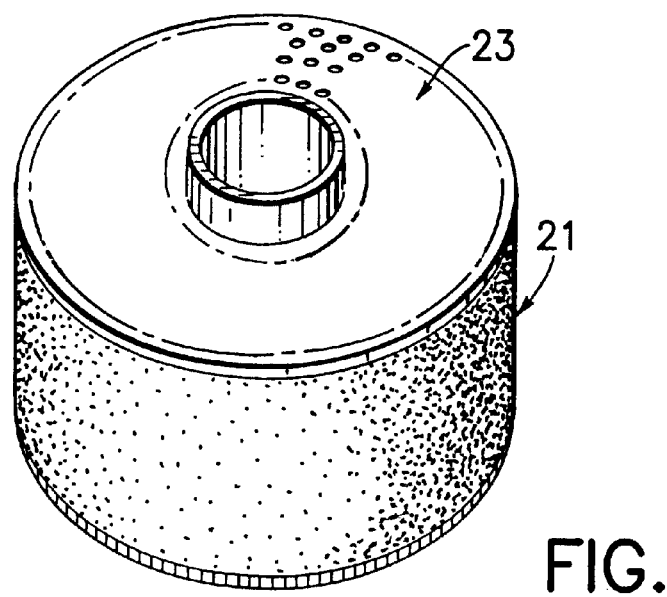
FIG. 12 is a top view of the outer micro-filter element having the upper outlet/inlet plate in position.

In further embodiments of this invention it can be appreciated that the overall length of the filter housing 11 could be reduced by a factor of about two by eliminating the second micro-fine filter element 22, and by making the length of the first micro-fine filter element 21 and the tube 12 about equal to the length of the normal filter element 30. This embodiment of the HOFA is depicted in a simplified form in FIG. 2B.

Thus, while the invention has been particularly shown and described with respect to preferred embodiments thereof, it will be understood by those skilled in the art that changes in form and details may be made therein without departing from the scope and spirit of the invention.

What is claimed is:

1. An oil filter assembly, comprising:

a housing;

a first oil filter element disposed in proximity to a bottom portion of said housing, said first oil filter element containing an open inner volume; and a second oil filter element having a generally circular cylindrical shape disposed circumferentially about a length of said first oil filter element, said second oil filter element filtering particles of a smaller size than said first oil filter element;

wherein said housing comprises a first oil inlet disposed at said bottom portion of said housing for providing oil to be filtered to side surfaces of said first oil filter element, wherein filtered oil flows through a thickness of said first oil filter element to said centrally located open inner volume, and from said centrally located open inner volume through an outlet of said filter housing, wherein said housing comprises a second oil inlet disposed at said bottom portion of said housing and surrounding said first oil inlet for providing oil to be filtered to a bottom surface of said second oil filter element, and wherein said housing comprises a fluid communication path from a top surface of said second oil filter element into said open inner volume of said first oil filter element such that oil filtered through a length of said second oil filter element is mixed with the oil filtered by said first oil filter element.

2. An oil filter assembly as in claim 1, wherein said fluid communication path comprises an orifice providing passage for filtered oil into said open inner volume of said first oil filter element, said orifice having a flow path area that is smaller than a flow path area of said second oil inlet.

3. An oil filter assembly as in claim 2, wherein said fluid communication path further comprises a third oil filter element disposed between said top surface of said second oil filter element and said orifice, wherein said third oil filter element also filters particles of a smaller size than said first oil filter element.

4. An oil filter assembly as in claim 3, wherein said third oil filter element is disposed above said first oil filter element in a stacked arrangement, and wherein said second oil filter element is disposed circumferentially about the length of said first oil filter element and the length of said third oil filter element.

5. An oil filter assembly as in claim 1, wherein said housing comprises a threaded section which is sized and shaped to be mounted onto a conventional threaded portion of a motor housing.

6. An oil filter assembly as in claim 1 wherein said first and second inlets communicate with each other.

7. An oil filter assembly as in claim 1 wherein said bottom portion of said housing comprises holes therethrough which form a portion of said first and second inlets.

8. An oil filter assembly as in claim 1 wherein said housing comprises a main inlet plate at a bottom of said second oil filter element, said main inlet plate having an outer set of holes therethrough which form a portion of said second inlet.

9. An oil filter assembly as in claim 8 wherein said main inlet plate has a center hole which forms a portion of said first inlet.

* * * * *